April 6, 1926.

J. C. HULL 1,579,319

SPRAYING MACHINE

Filed June 19, 1922        2 Sheets-Sheet 1

Inventor
John C. Hull

By   Bacon Thomas
            Attorneys

April 6, 1926.
J. C. HULL
1,579,319
SPRAYING MACHINE
Filed June 19, 1922   2 Sheets-Sheet 2
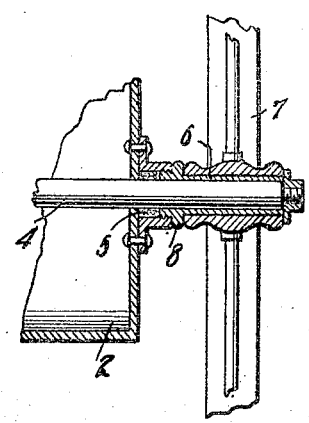
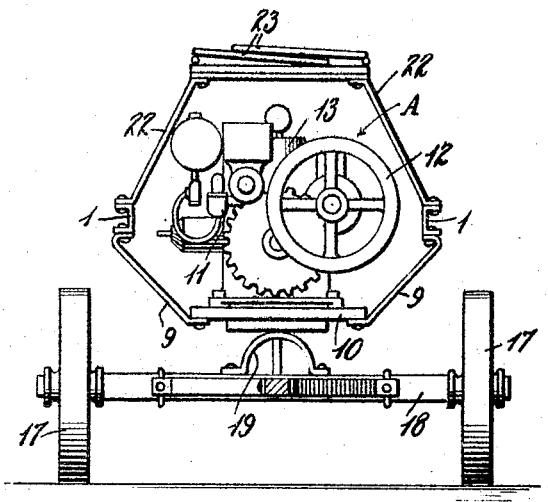
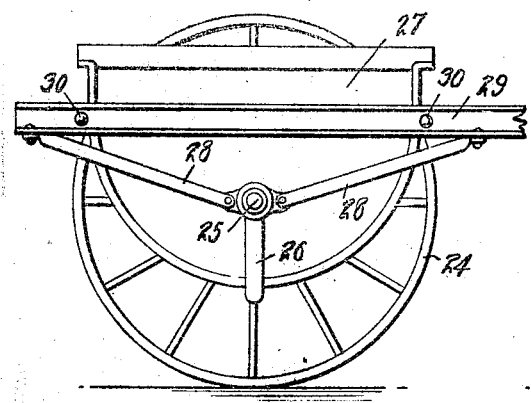
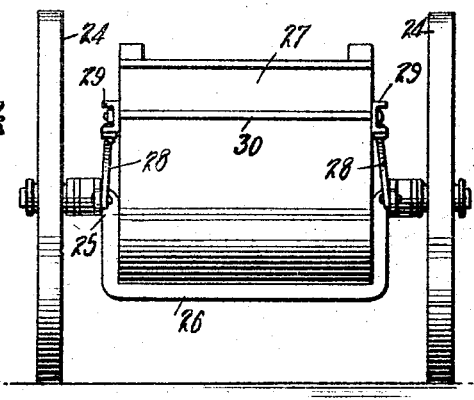
Inventor
John C. Hull
By Bacon & Thomas
Attorneys Patented Apr. 6, 1926.

1,579,319

UNITED STATES PATENT OFFICE.

JOHN C. HULL, OF GASPORT, NEW YORK.

SPRAYING MACHINE.

Application filed June 19, 1922. Serial No. 569,569.

*To all whom it may concern:*

Be it known that I, JOHN C. HULL, a citizen of the United States, residing at Gasport, in the county of Gasport and State of New York, have invented certain new and useful Improvements in Spraying Machines, of which the following is a specification.

The invention relates to improvements in spraying machines for use in spraying orchards or other vegetation with an insecticide solution.

It is an object of the invention to provide an improved type of portable power spraying machine, the invention having particular reference to improved means for suspending the solution tank and the driving motor and pump.

More specifically, the invention aims to provide an improved form of frame structure for portable spraying machines provided with means for most conveniently supporting the solution tank at one end of the frame, with the motor and compressor unit suspended at the opposite end thereof.

From a more specific aspect the invention comprises a portable spraying machine wherein a solution tank is placed between the rear wheels of the machine with the axle passing through the lower part thereof so that said tank has a very low center of gravity, with a platform suspended from the forward part of the frame and adapted to receive and support the pump and motor unit communicating with the solution tank. The frame of the machine is so positioned as to permit the front wheels to be freely turned thereunder while ahe axle receiving said wheels is directly pivoted by a fifth wheel or otherwise to the depending platform supporting the motor and pump unit, which overlies the axle.

In the accompanying drawings I have shown several preferred embodiments of my invention, but it will be appreciated that the invention is susceptible of many changes without departing from the spirit thereof.

In the drawings Figure 1 represents a side elevation of my device.

Fig. 2 is a detailed view with parts in section showing the axle passing through the tank.

Fig. 3 is a front view.

Figs. 5 and 6 are side and end views of the modified form shown in Fig. 4.

Figure 1:
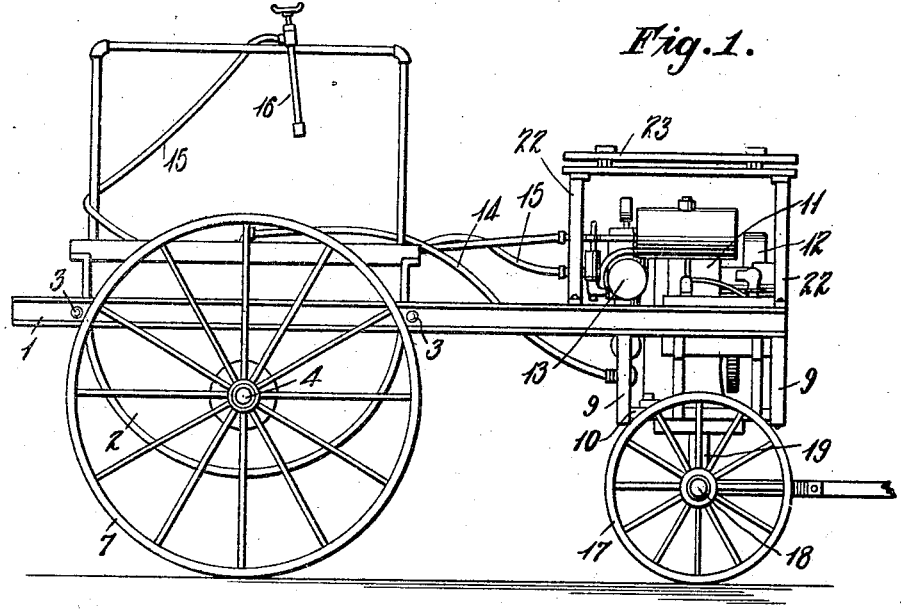

Referring now more particularly to the drawings wherein like reference characters indicate corresponding parts, the numeral 1 designates a pair of side channel bars which constitute the frame of the machine. These bars near their rear ends are clamped to the solution tank 2 by means of the tie rods 3 having adjustable nuts or the equivalent thereof at one end. The solution tank, as will be clearly observed in Figure 1, is disposed crosswise between the channel frame bars 1.

The rear axle 4 of the machine passes through the solution tank 2, at a point below its center of gravity serving to stiffen or reinforce the tank and also to suspend the same in a very low position. The tank is therefore directly suspended on the axle which carries substantially all the weight thereof so that no material weight of the tank is placed upon the frame structure formed by the bars 1. Suitable packings 5 are provided where the axle passes through the sides of the tank for the purpose of preventing leakage of the contents thereof. Wheel supports or skeins 6 are fitted on the rear axle at each side of the tank and upon these supports or skeins the wheels 7 freely rotate. The axle does not rotate with the wheels, as the same is stationary, and merely acts as a support and stiffener for the tank. The side frame bars 1 extend forwardly materially beyond the solution tank 2, and near the forward end thereof I provide a pair of depending metallic straps or suspension irons 9 which are riveted to the side irons 1 and are spaced apart as indicated in Figure 1. These straps drop materially below the under side of the frame irons 1 and suspend and support a platform 10 which is rigidly fitted to the straps. Upon this platform I mount a pumping unit A consisting of a gasoline engine 11 having the fly wheel 12 with the usual carburetor and ignition system and the double acting pump 13 communicating by means of the tube 14 with the solution tank tube for withdrawing the solution from the tank and forcing the same as a spray through the discharge tube 15 to apply the insecticide upon trees, plants or the like. A suitable nozzle 16 is preferably attached to the discharge tube 15. Any form of engine and pump may be used in keeping with the spirit of my invention, so that no particular engine or pump structure will be herein described. It is preferable, however, to arrange the pump and gasoline electric or other motor in a unitary structure so that the same can be most conveniently suspended and supported on the depending platform 10. The spraying machine is provided with relatively small front wheels 17 connected by an axle 18 and the machine herein shown is one which is drawn by horse power. However, the machine may be a motor driven one if desirable. The axle 18 is pivotally connected to the suspended platform 10 at substantially the center thereof by means of the fifth wheel 19. Any form of fifth wheel can be employed, but I preferably position the fifth wheel with respect to the platform 10 in a manner so that the platform is directly over the front axle and the weight of the compressor unit thereby applied to said axle, it being apparent that in this construction the tank 2 is suspended by the rear axles and the pump and power unit suspended by the front axle. The pump and power unit by being mounted upon the suspended platform occupies a most desirable position and also permits the front wheels to have a complete turning movement without engaging the side bars 1 thereby shortening the turning radius of the spraying machine so that the same can be used in very congested or confined zones. It will be further appreciated that the side bars 1 act more as truss rods or elements for connecting the rear tank 2 with the compressor and engine unit, and as no great strain is placed upon such bars the same can be made of comparatively light material, thus cheapening the cost of the machine, and at the same time providing one which will stand all necessary weight and strains. Manifestly, the platform 10 may be formed in various manners, and the same may be suspended in any convenient way, or if desirable it is not entirely essential that said platform be suspended as it may be conveniently connected in any manner with the side frames 2 and mounted over the front axle 18.

For the purpose of forming a protecting casing or cover for the compressor or motor unit when the same is not in use, frame members 22 projecting upwardly from the side frames 1 receive the hinged cover plates 23 which may be lowered so as to enclose the motor and pump or opened so as to occupy the position shown in Figure 6.

Figure 4:
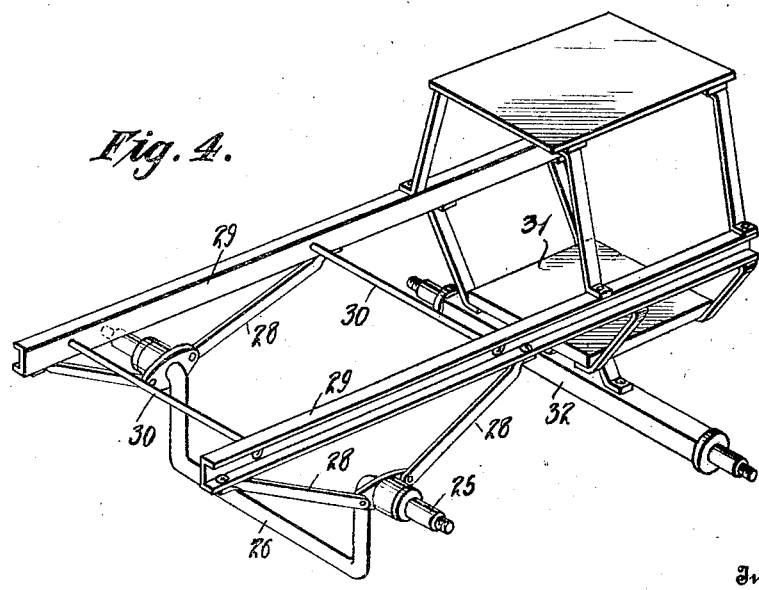
Fig. 4 is a modified form of the apparatus disclosing an underslung axle.

In Figs. 4, 5, and 6 of the drawings, I have shown another embodiment of my invention wherein the same generic idea is disclosed, but the structure of the spraying machine somewhat modified. In this disclosure I provide the usual rear supporting wheels 24 connected to the axle 25 having the dropped portion 26 which directly supports and has attached thereto the solution tank 28. It is to be noted that in this embodiment the axle does not pass through the solution tank, but the solution tank is directly positioned over the axle in the manner disclosed in Fig. 6. In this form of the invention I employ frame rods 28, which are connected to the axle at each side thereof, and likewise connected to the side frame bars 29 of the spraying machine between which is seated the solution tank. The frame rods 28 may be of any desirable material, but are preferably sufficiently heavy to form the desired connections between the rear axle and the side rails 29 of the machine.

Transverse tie rods 30 may be also used for connecting the side rails 29. In the embodiment of my invention, as shown in Fig. 4, a platform 31 is provided, the same being of the formation of the platform shown in Fig. 1, and receives and supports the pump and motor unit X. The front axle 32 having the wheels is pivoted to the platform.

Having thus described my invention, what I claim is:

1. A spraying machine, comprising suitable side bars, a solution tank disposed near the rear ends of said side bars, an axle passing directly through said solution tank below the center thereof, wheels mounted upon said axle, an underslung platform near the forward end of said side bars, downwardly disposed members supporting said platform connected with said side bars, a pair of front wheels, and an axle connecting said wheels, means for pivotally connecting the axle with said platform, a spraying pump and motor therefor mounted on said platform, and a communication between said tank and said pump.

2. A spraying machine comprising a tank positioned crosswise of the machine, an axle directly connected with said tank and supporting the same, wheels journaled on said axle, a pair of frame bars connected with the tank and extending forwardly thereof, an underslung platform supported by said frame bars near the forward end, an axle pivoted on said platform, wheels journaled on said axle, and a pump and motor therefor mounted upon the platform over said axle, said pump being in communication with the solution tank.

3. In a spraying machine, the combination with a frame and front and rear axles, supporting wheels on said axles, a solution tank suspended upon said rear axle and disposed crosswise of said machine, a platform at the forward end of the frame mounted directly above the front axle and underslung from said frame, a motor and pump unit mounted on said platform, said pump communicating with the tank, and means carried by the platform for pivotally connecting the forward axle thereto.

4. In a spraying machine, the combination with a frame, of a rear axle therefor, a solution tank supported on said rear axle and having a portion thereof suspended below the frame, a front axle for said frame, wheels on said front axle, a platform suspended from said frame and connected to said front axle, a pumping mechanism mounted on said platform and a connection between said solution tank and said pumping mechanism.

5. A spraying machine, comprising a frame, a solution tank suspended thereon, a rear axle connected with said solution tank and directly supporting the same, wheels on said axle, a platform suspended from the forward end of said frame, a front axle, a pivotal connection between said front axle and said platform, a pumping unit mounted on said platform and a communication between said solution tank and said pumping unit.

6. A spraying machine comprising front and rear axles and wheels thereon, frame bars between said axles, a solution tank mounted on said rear axle and occupying a low center of gravity by extending materially below the frame bars of the machine, a platform carried by the frame bars at the forward end thereof, a motor and pump mounted on said platform, said pump communicating with said solution tank, and means for pivotally connecting the platform with the forward axle of said machine.

JOHN C. HULL.